US011568279B2

(12) United States Patent
Schimpfky et al.

(10) Patent No.: US 11,568,279 B2
(45) Date of Patent: Jan. 31, 2023

(54) ANOMALY DETECTION FOR AUTOMATED INFORMATION TECHNOLOGY PROCESSES

(71) Applicant: SAP SE, Walldorf (DE)

(72) Inventors: Rolf Schimpfky, Dresden (DE); Christian Martick, Wendisch Rietz (DE)

(73) Assignee: SAP SE, Walldorf (DE)

( * ) Notice: Subject to any disclaimer, the term of this patent is extended or adjusted under 35 U.S.C. 154(b) by 322 days.

(21) Appl. No.: 16/896,392

(22) Filed: Jun. 9, 2020

(65) Prior Publication Data

US 2021/0383248 A1 Dec. 9, 2021

(51) Int. Cl.
G06F 15/173 (2006.01)
G06N 5/02 (2006.01)
G06F 17/18 (2006.01)
H04L 41/5041 (2022.01)
H04L 41/5054 (2022.01)
G06F 15/16 (2006.01)

(52) U.S. Cl.
CPC ............. G06N 5/025 (2013.01); G06F 17/18 (2013.01); H04L 41/5048 (2013.01); H04L 41/5054 (2013.01)

(58) Field of Classification Search
CPC ........ G06N 5/025; G06N 7/005; G06F 17/18; H04L 41/5048; H04L 41/5054; H04L 43/08; H04L 41/16; H04L 41/142; H04L 43/16; H04L 41/145
USPC ....................................................... 709/224
See application file for complete search history.

(56) References Cited

U.S. PATENT DOCUMENTS

| | | | | |
|---|---|---|---|---|
| 9,419,842 B1* | 8/2016 | Galliher, III | ........ | H04L 49/1515 |
| 10,728,085 B1* | 7/2020 | Chen | .................... | H04L 41/0659 |
| 11,048,487 B1* | 6/2021 | Mestchian | ................ | G06F 8/72 |
| 11,282,291 B1* | 3/2022 | Boardman | ............ | G06T 1/0007 |
| 11,283,690 B1* | 3/2022 | Mosier | ................ | H04L 43/0817 |
| 11,341,414 B2* | 5/2022 | Rausch | ............. | G06F 16/24568 |
| 2014/0269299 A1* | 9/2014 | Koornstra | ............... | H04L 41/12 370/235 |
| 2016/0110549 A1* | 4/2016 | Schmitt | ..................... | G06F 8/77 726/25 |
| 2016/0359592 A1* | 12/2016 | Kulshreshtha | ...... | H04L 63/1458 |

(Continued)

OTHER PUBLICATIONS

To et al., "Entropy-based histograms for selectivity estimation." Proceedings of the 22nd ACM international conference an Information & Knowledge Management, Oct. 27, 2013, 10 pages.

Primary Examiner — Karen C Tang
(74) Attorney, Agent, or Firm — Fish & Richardson P.C.

(57) ABSTRACT

Methods, systems, and computer-readable storage media for receiving a record including a set of attributes, each attribute having an attribute value, the record representing automatic execution of an IT process within a managed system, retrieving a model representing historical executions of the IT process and including a set of distribution parameters associated with a first type of attribute and a set of probability distributions associated with a second type of attribute, determining, for a first attribute, a first score based on distribution parameters and a value, determining, for a second attribute, a second score based on a probability distribution and a value, the second attribute being of the second type of attribute, and selectively indicating that the IT process is anomalous based on an outlier score.

20 Claims, 5 Drawing Sheets

(56) References Cited

U.S. PATENT DOCUMENTS

| | | | |
|---|---|---|---|
| 2017/0288966 A1* | 10/2017 | Chakra | H04L 67/306 |
| 2018/0115466 A1* | 4/2018 | Kazemian | H04L 41/14 |
| 2018/0123898 A1* | 5/2018 | Yakuwa | H04L 41/14 |
| 2018/0173873 A1* | 6/2018 | Hassforther | G06F 21/552 |
| 2018/0324093 A1* | 11/2018 | Namjoshi | H04L 41/0866 |
| 2018/0374104 A1* | 12/2018 | Meusel | G06Q 30/0201 |
| 2019/0312810 A1* | 10/2019 | Strom | H04L 45/123 |
| 2019/0353277 A1* | 11/2019 | Sundareswara | F16K 37/0041 |
| 2020/0067969 A1* | 2/2020 | Abbaszadeh | G06K 9/6269 |
| 2020/0252296 A1* | 8/2020 | Iashyn | G06N 3/0454 |
| 2020/0274752 A1* | 8/2020 | Shah | H04L 12/2863 |
| 2020/0285899 A1* | 9/2020 | Chen | G06N 20/00 |
| 2020/0404513 A1* | 12/2020 | Hayes | H04L 67/125 |
| 2021/0141900 A1* | 5/2021 | Brown | G06F 21/566 |
| 2021/0144164 A1* | 5/2021 | Mathur | H04L 41/145 |
| 2021/0312452 A1* | 10/2021 | Allbright | G06Q 20/4016 |
| 2021/0312453 A1* | 10/2021 | Allbright | G06Q 20/34 |
| 2021/0314333 A1* | 10/2021 | Krisiloff | G06N 5/02 |
| 2021/0351982 A1* | 11/2021 | Albrecht | H04L 67/12 |
| 2021/0365643 A1* | 11/2021 | Agrawal | G06F 40/35 |
| 2021/0383297 A1* | 12/2021 | Ognev | G06Q 10/06313 |
| 2022/0006726 A1* | 1/2022 | Michael | H04L 45/745 |
| 2022/0029885 A1* | 1/2022 | Sadasivarao | H04J 14/0227 |
| 2022/0101192 A1* | 3/2022 | Patel | G06K 9/6263 |
| 2022/0121884 A1* | 4/2022 | Zadeh | G06F 16/953 |
| 2022/0129816 A1* | 4/2022 | Ralhan | G06F 40/16 |
| 2022/0150112 A1* | 5/2022 | Neginhal | H04L 41/0889 |

\* cited by examiner

ANOMALY DETECTION FOR AUTOMATED INFORMATION TECHNOLOGY PROCESSES

BACKGROUND

Enterprises can use software systems to support and execute operations. In many cases, enterprises can use hundreds to thousands of software systems across a landscape. A landscape can include components (which can also be referred to as information technology (IT) components), such as the software systems, servers, computing devices, and the like. In many instances, landscapes can be relatively large including, for example, thousands of landscape components.

Execution of software systems across a landscape implies management of the landscape components across the landscape. For example, numerous IT processes can be executed across the landscape during management of the landscape. For relatively large landscapes, this can include hundreds to thousands of IT processes. To handle this, landscape management systems have been developed that enable automated execution and monitoring of IT processes. However, there are hundreds of parameters/dimensions that can be monitored to alert to problematic execution of automated IT processes.

Traditional alerting tools use thresholds and/or threshold combinations in alerting rules (e.g., execution lasted longer than two hours, process execution encountered one error, process execution encountered five warnings). However, such traditional alerting tools can be cumbersome in terms of computing resources that are consumed, and do not consistently generate accurate results. Further, the thresholds used typically cover values for a relatively small number of attributes, and the attributes that are monitored and the threshold values that are applied are selected based on experience or by reviewing past process executions. Accordingly, current solutions for monitoring of automated IT processes have certain disadvantages. For example, such solutions either do not scale well for large IT systems (large landscapes) and/or frequently produce false positives.

SUMMARY

Implementations of the present disclosure are directed to automated information technology (IT) processes. More particularly, implementations of the present disclosure are directed to anomaly detection for automated IT processes.

In some implementations, actions include receiving, by a monitoring system, a record including a set of attributes, each attribute having an attribute value, the record representing automatic execution of an IT process within a managed system, retrieving a model from a set of models, the model representing historical executions of the IT process within one or more managed systems, the model including a set of distribution parameters associated with a first type of attribute and a set of probability distributions associated with a second type of attribute, determining, for a first attribute of the set of attributes, a first score based on distribution parameters provided from the set of distribution parameters and a value of the first attribute, the first attribute being of the first type of attribute, determining, for a second attribute of the set of attributes, a second score based on a probability distribution provided from the set of probability distributions and a value of the second attribute, the second attribute being of the second type of attribute, calculating an outlier score representative of the automatic execution of the IT process at least partially based on the first score and the second score, and selectively indicating that the automatic execution of the IT process is anomalous based on the outlier score. Other implementations of this aspect include corresponding systems, apparatus, and computer programs, configured to perform the actions of the methods, encoded on computer storage devices.

These and other implementations can each optionally include one or more of the following features: the outlier score is a normalized score that is calculated based on a sum of the first score and the second score; the distribution parameters include a mean ($\mu$) and a standard deviation ($\sigma$); a set of relevant attributes is determined from the model, and the first attribute and the second attribute of the set of attributes are identified as relevant attributes based on the set of relevant attributes; actions further include retrieving historical data representative of historical executions of the IT process in the one or more managed systems, the historical data including historical records, each historical record including a set of historical attributes, each historical attribute having a historical value associated therewith, for each historical attribute of the first type of attribute, providing distribution parameters to be included in the set of distribution parameters, for each historical attribute of the second type of attribute, providing a probability distribution to be included in the set of probability distributions, and generating the model including the set of distribution parameters and the set of probability distributions; actions further include, in response to indicating that the execution of the IT process is anomalous, automatically transmitting a notification to a front-end client; and the first type of attribute includes a metric attribute and the second type of attribute includes a nominal attribute.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
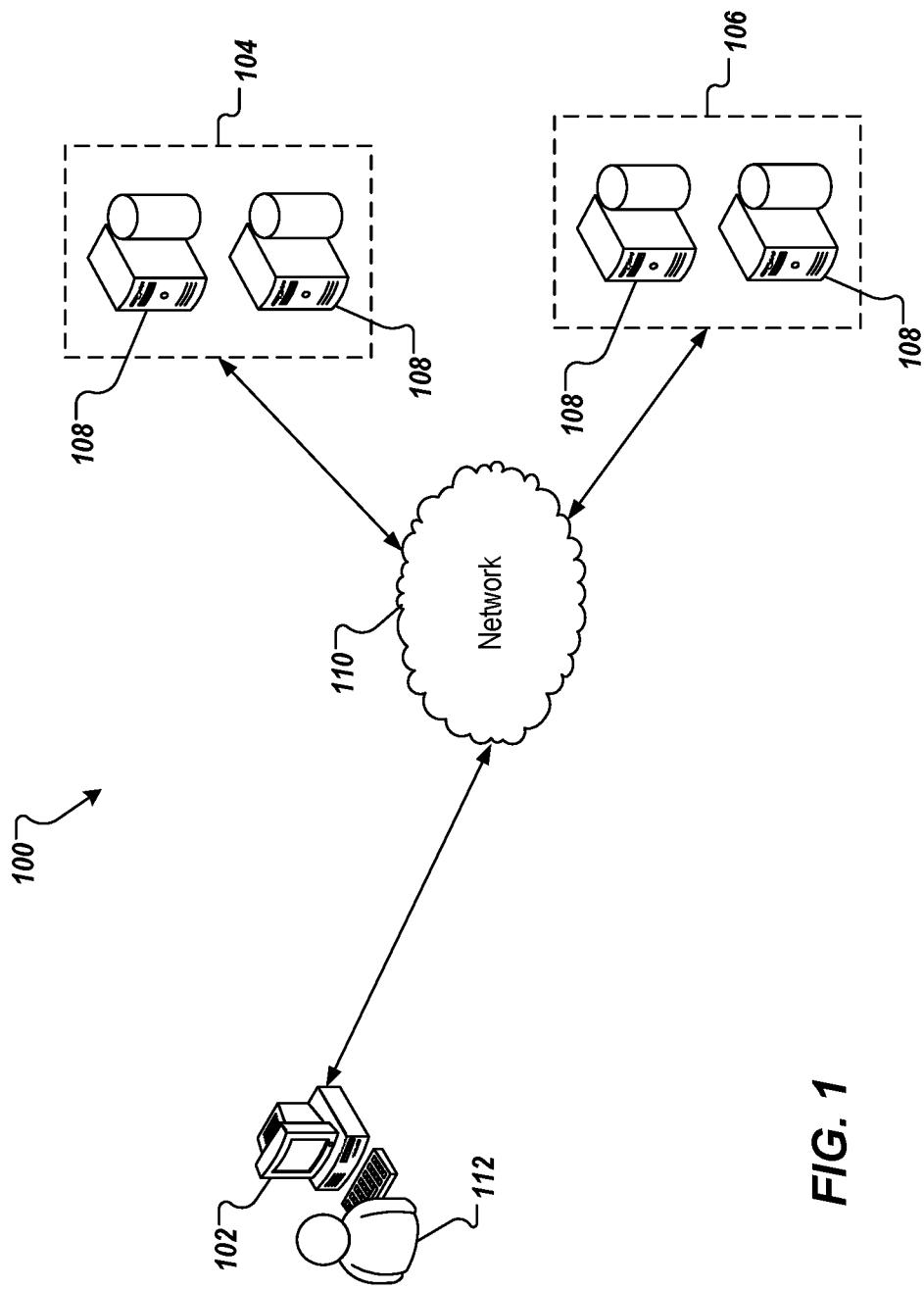
FIG. 1 depicts an example architecture that can be used to execute implementations of the present disclosure.

Implementations of the present disclosure are directed to automated information technology (IT) processes. More particularly, implementations of the present disclosure are directed to anomaly detection for automated IT processes. Implementations can include actions of receiving, by a monitoring system, a record including a set of attributes, each attribute having an attribute value, the record representing automatic execution of an IT process within a managed system, retrieving a model from a set of models, the model representing historical executions of the IT process within one or more managed systems, the model including a set of distribution parameters associated with a first type of attribute and a set of probability distributions associated with a second type of attribute, determining, for a first attribute of the set of attributes, a first score based on distribution parameters provided from the set of distribution parameters and a value of the first attribute, the first attribute being of the first type of attribute, determining, for a second attribute of the set of attributes, a second score based on a probability distribution provided from the set of probability distributions and a value of the second attribute, the second attribute being of the second type of attribute, calculating an outlier score representative of the automatic execution of the IT process at least partially based on the first score and the second score, and selectively indicating that the automatic execution of the IT process is anomalous based on the outlier score.

Implementations of the present disclosure are described in further detail herein with reference to an example landscape management system. An example landscape management system includes SAP Landscape Management (LaMa) provided by SAP SE of Walldorf, Germany. It is contemplated, however, that implementations of the present disclosure can be realized with any appropriate landscape management system.

To provide further context for implementations of the present disclosure, enterprises can use software systems to support and execute operations. In many cases, enterprises can use hundreds to thousands of software systems across a landscape. A landscape can include components (which can also be referred to as IT components), such as the software systems, servers, computing devices, and the like. In many instances, landscapes can be relatively large including, for example, thousands of landscape components.

Execution of software systems across a landscape implies management of the landscape components across the landscape. For example, numerous IT processes can be executed across the landscape during management of the landscape to maintain appropriate operation of the software systems. For relatively large landscapes, this can include hundreds to thousands of IT processes. To handle this, landscape management systems have been developed that enable automated execution and monitoring of IT processes.

Landscape management systems enable administrators to automate at least some of the IT processes for operating system landscapes. Example IT processes can include, without limitation, start/stop of systems, relocation of systems (or instances) from one host to another host, efficient mass operations on a complete landscape or parts of a landscape, constant validation of landscapes, system copy/cloning/provisioning, automated capacity management, operations on chains of dependent systems, and additional reporting, monitoring and visualization capabilities. To implement these operations, landscape management systems leverage and integrate with infrastructure components and services. These can include, for example, platform and storage virtualization, network management, and central user management. Landscape management systems can leverage tools, components, and services for the automation of specific tasks (e.g., installation of application servers, renaming of a system, start/stop of servers).

In some examples, landscape management systems are provided as a monolithic application executing on a server system. With particular reference to SAP LaMa, LaMa can be provided as a Java application running as an on-premise deployment on a SAP NetWeaver Application Server (AS) Java stack. In some examples, landscape management systems are provided as cloud-based applications executing in a cloud computing environment. In either case, a landscape management system can manage hundreds to thousands of landscape components. In this sense, a landscape can itself be referred to as a managed system.

Automated IT processes for managing landscapes are built for minimal interaction in order to minimize total cost of ownership (TCO). However, due to the absence of a human user constantly checking (e.g., for the health of an IT process), a tool needs to be in place to monitor data representative of landscape operations and execution of IT processes. Even based on this data, it is far from trivial to determine whether an actual problem is occurring in the context of activities performed for automated IT processes.

In further detail, the complexity of IT landscapes requires complex IT processes for efficient and effective system operations. For different aspects of landscape management (e.g., backup, software logistics, change management, virtualization), the capabilities of specialized tools are combined into a framework for standardization. This framework can be referred to as an automation framework. Execution of activities within the automation framework generates complex data streams. In monitoring the activities, it can be difficult to determine whether a given set of data points or series of data points implicate a potentially problematic situation.

In software systems, there are hundreds of parameters/dimensions that can be monitored to alert to problematic execution of automated IT processes. Traditional alerting tools use thresholds and/or threshold combinations in alerting rules (e.g., execution lasted longer than two hours, process execution encountered one error, process execution encountered five warnings). However, such traditional alerting tools can be cumbersome in terms of computing resources consumed, and do not consistently generate accurate results. Further, the thresholds used typically cover values for a relatively small number of attributes, and the attributes that are monitored and the threshold values that are applied are selected based on experience or by reviewing past process executions. Also, thresholds and corresponding alerting rules are defined per attribute. Accordingly, current solutions for monitoring of automated IT processes have certain disadvantages. For example, such solutions either do not scale well for large IT systems (large landscapes) or frequently produce false positives.

In view of this, and as described in further detail herein, implementations of the present disclosure leverage the historical data that represents execution of IT processes within managed systems (landscapes). The historical data is generated through monitoring of execution of automated IT processes and includes voluminous data points for many different parameters. In further detail, implementations of the present disclosure provide a model-based solution to automatically process data representative of landscape operations, selectively detect anomalies represented within the data, and provide alerting based on actual user context of respective scenarios. Implementations of the present disclosure enable automated IT processes to be enhanced with anomaly-based alerting capabilities and can be provided within an existing deployed stack of IT landscape management systems.

FIG. 1 depicts an example architecture 100 in accordance with implementations of the present disclosure. In the depicted example, the example architecture 100 includes a client device 102, a network 110, and server systems 104, 106. The server systems 104, 106 each include one or more server devices and databases 108 (e.g., processors, memory). In the depicted example, a user 112 interacts with the client device 102.

In some examples, the client device 102 can communicate with the server system 104 and/or the server system 106 over the network 110. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each of the server systems 104, 106 includes at least one server and at least one data store. In the example of FIG. 1, the server systems 104, 106 are intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host one or more managed systems (landscapes, or portions of landscapes) that support operations of one or more enterprises. Further, the server system 106 can host a landscape management system that is used to execute IT operations on landscape components of the managed systems of the server system 104. For example, the landscape management system can initiate automated execution of IT processes to manage landscape components of the managed systems. In some implementations, the landscape management system provides functionality for model-based monitoring and alerting of anomalies in automated execution of IT processes, as described in further detail herein.

Figure 2:
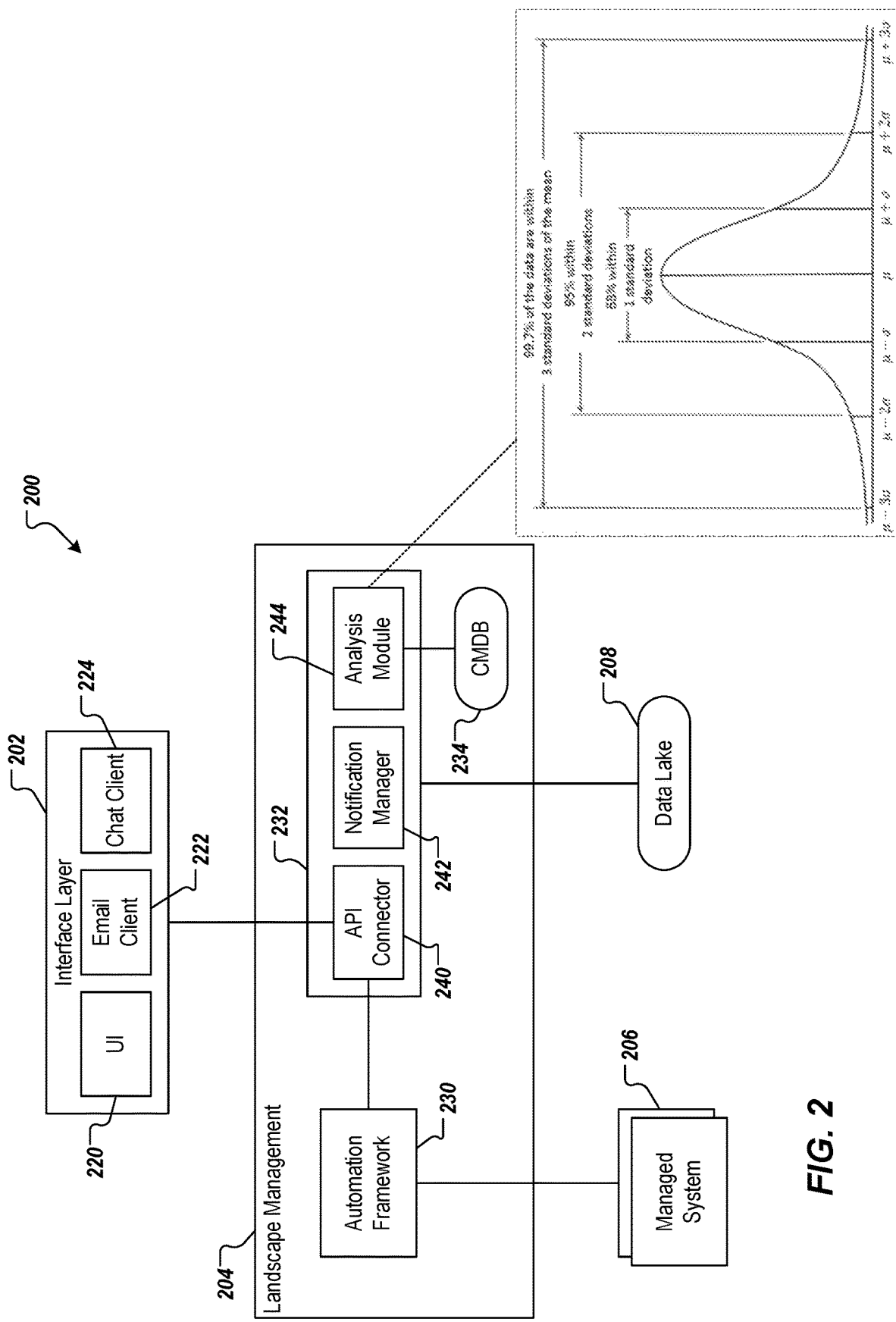
FIG. 2 depicts an example conceptual architecture for providing anomaly detection for automated information technology (IT) processes in accordance with implementations of the present disclosure.

FIG. 2 depicts an example conceptual architecture 200 for providing anomaly detection for automated information technology (IT) processes in accordance with implementations of the present disclosure. The example conceptual architecture 200 includes an interface layer 202 (e.g., at least partially provided through the client device 102 of FIG. 1), a landscape management layer 204 (e.g., at least partially hosted within the server system 106 of FIG. 1), one or more managed systems 206 (e.g., at least partially hosted within the server system 104 of FIG. 1), and a data lake 208.

In some examples, the interface layer 202 enables users to interact with the landscape management layer 204. For example, notifications issued by the landscape management layer 204 can be displayed to users at the interface layer 202. In some implementations, and as described in further detail herein, the landscape management layer 204 provides one or more models that are used for monitoring IT processes executed within each of the one or more managed systems 206. For example, the data lake 208 stores historical data representative of execution of IT processes, which historical data is processed by the landscape management layer 204 to provide the one or more models.

In the example of FIG. 2, the interface layer 202 includes a user interface (UI) 220, an email client 222, and a chat client 224. In some examples, each of the UI 220, the email client 222, and the chat client 224 enable communication with the landscape management layer 204 through a respective channel. For example, the UI 220 can graphically present information (e.g., notifications, alerts) received from the landscape management layer 204. As another example, the email client 222 enables email communication between the interface layer 202 and the landscape management layer 204 (e.g., the email client 222 receives an email from the landscape management layer 204, the email describing an alert and/or notification). As another example, the chat client 224 enables chat (e.g., instant messaging) communication between the interface layer 202 and the landscape management layer 204 (e.g., the chat client 224 receives a chat message from the landscape management layer 204, the chat message describing an alert and/or notification). Although example channels are described herein, it is appreciated that the interface layer 202 and the landscape management layer 204 can communicate using any appropriate channel.

In the example of FIG. 2, the landscape management layer 204 includes an automation framework 230, a monitoring system 232, and a configuration database (CMDB) 234. As described in further detail herein, the monitoring system 232 monitors IT processes executed within the one or more managed systems 206 and selectively issues alerts/notifications to the interface layer 202. The monitoring system 232 includes an application programming interface (API) connector 240, a notification manager 242, and an analysis module 244.

In some implementations, the automation framework 230 automatically initiates execution of IT processes in each of the one or more managed systems 206. In some examples, each IT process includes a set of tasks (one or more tasks) and each task corresponds to at least one activity that is executed within a managed system 206. In some examples, a task is determined to be complete when the at least one activity is complete, and an IT process is determined to be complete when all tasks in the set of tasks are complete. Example IT processes can include, without limitation, start/stop of servers, installation of a software system, moving a software system to a different network, restoring a database, and the like.

For example, the automation framework 206 can transmit instructions to a managed system 206, the instructions indicating one or more activities that are to be executed within the managed system 206, the one or more activities corresponding to a task of an IT process. In response to the instructions, the managed system 206 can execute the one or more activities (or attempt to execute the one or more activities) and can provide data back to the automation framework 206. In some examples, the data represents execution of the one or more activities, as described in further detail herein.

In some examples, the data provided to the automation framework 206 from the managed system 206 is collected and represents execution of an IT process. Example data is described in further detail in Table 1:

TABLE 1

Example Data Collected - IT Process Execution

| Entity | Data | Description |
| --- | --- | --- |
| Process | Timestamps | Start and end of process executions. Timestamp of changes in execution status and phase. |
| Process | Status | Intermediate and final values for execution of process (e.g., waiting for user input, error, on hold). |

TABLE 1-continued

Example Data Collected - IT Process Execution

| Entity | Data | Description |
| --- | --- | --- |
| Process | Durations | Amount of time spent in different execution phases (e.g., active execution, waiting for user input, waiting for network). |
| Task | Timestamps | Start and end of task executions. Timestamp of task execution status changes. |
| Task | Indicators | Flags showing execution states of task (e.g., waiting for human input, restart required, error occurred). |
| Task | Status | Intermediate and final values for execution of task. |
| Task | Timestamps | Amount of time spent in different execution phases (e.g., active execution, waiting for user input, waiting for network). |

In some implementations, the API connector 240 receives data from the automation framework 206, the data being representative of automated execution of an IT process within a managed system 206. In some examples, the API connector 240 transforms the data into a canonical representation that is consumable by the analysis module 244 within the monitoring system. This canonical representation of the data is stored within the data lake 208. Examples of this are depicted in Tables 2 and 3, below.

TABLE 2

Example Data Format - IT Process Execution & Task Execution Data

| Process Exec'n Key | System Number | Process Name | Start Date Time | End Date Time | Wait Time | Net run-time | Status |
| --- | --- | --- | --- | --- | --- | --- | --- |
| PE_100 | 00047568 | RESTART_DB | 20.03.20 20 07:30 | 20.03.20 20 08:40 | 30 | 40 | Success |
| PE_200 | 00042757 | CHANGE_TIMEZONE | 22.03.20 20 17:30 | 22.03.20 20 17:40 | 0 | 10 | Success |

TABLE 3

Example Data Format - IT Process Execution & Task Execution Data

| Process Execution Key | Task Execution Key | Task Name | Start Date Time | End Date Time | Retry Counter | Error Occurred | Status |
| --- | --- | --- | --- | --- | --- | --- | --- |
| PE_100 | TE_101 | Write Audit Log | 20.03.2020 07:30 | 20.03.2020 07:31 | 0 | 0 | Success |
| PE_100 | TE_102 | Lock Users | 20.03.2020 07:31 | 20.03.2020 07:32 | 2 | 2 | Success |
| PE_100 | TE_103 | Shutdown DB | 20.03.2020 07:32 | 20.03.2020 07:35 | 0 | 0 | Success |
| PE_100 | TE_104 | Shutdown OS | 20.03.2020 07:35 | 20.03.2020 07:40 | 0 | 0 | Success |
| PE_100 | TE_105 | Start OS | 20.03.2020 07:40 | 20.03.2020 07:45 | 0 | 0 | Success |
| PE_100 | TE_106 | Start DB | 20.03.2020 07:45 | 20.03.2020 08:00 | 0 | 0 | Success |
| PE_100 | TE_107 | Unlock Users | 20.03.2020 08:00 | 20.03.2020 08:00 | 0 | 1 | Failed |
| PE_200 | TE_201 | Write Audit Log | 22.03.2020 17:30 | 22.03.2020 17:30 | 3 | 2 | Success |
| PE_200 | TE_202 | Change Timezone | 22.03.2020 17:31 | 22.03.2020 17:31 | 0 | 0 | Success |
| PE_200 | TE_203 | Send Notification | 22.03.2020 17:31 | 22.03.2020 17:31 | 0 | 0 | Skipped |

In accordance with implementations of the present disclosure, the analysis module 244 retrieves historical data from the data lake 208, which historical data represents patterns of IT process execution within the managed system 206. As described herein, the analysis module 244 integrates additional information about the IT landscape, the additional information being provided from the CMDB 234. An example of this is depicted in Table 4, below.

TABLE 4

Example Data - Additional information about Automation Content & Systems

| Task Name | Task Version | Task Type | Task Description |
|---|---|---|---|
| Write Audit Log | 12 | Automated | Write administrative data to log for Audit Compliance |
| Send Notification | 5 | Manual | Notify customer via Email about change |

| System Number | System Data Base | System Technology Type | System Business Type | System Customer |
|---|---|---|---|---|
| 00047568 | HANA | Database | Production | Customer-01 |
| 00042757 | none | ABAP Server | Test | Customer-02 |

In some examples, the additional information includes organizational master data that describes the whole landscape inventory in a highly structured format. Example additional information can include, without limitation, technical and organizational information about IT systems (e.g., software-level of the managed systems 206) and IT infrastructure information (e.g., virtualization, hardware). In accordance with implementations of the present disclosure, the historical data from the data lake and the additional information from the CMDB 234 are processed through a learning process to develop a model that represents collective execution (multiple executions, collectively) of an IT process within one or more managed systems 206.

After a model has been provided for an IT process, data received by the automation framework 230 can be processed through the model of the IT process to detect anomalies (e.g., anomalous execution of the IT process). If an anomaly is detected, the notification manager 242 is triggered to transform the anomaly into a human-readable alert that is transmitted to any user-relevant frontend client (e.g., the UI 220, the email client 222, the chat client 224).

As discussed above, a model is provided for an IT process. In some examples, a set of models is provided, each model in the set of models being specific to an IT process that is executed by the automation framework 230 within the one or more managed systems 206. For example, a set of IT processes can be provided as $\mathbb{P} = \{P_1, \ldots, P_m\}$, where m is the number of IT processes P in the set of IT processes. Accordingly, a set of models can be provided as $\mathbb{M} = \{M_1, \ldots, M_m\}$, each model M corresponding to a respective IT process P.

In some examples, a model can be provided as a statistical model. In some implementations, a model M is trained based on historical data in a set of records $\mathbb{R}$. In some examples, the set of records $\mathbb{R}$ for a respective IT process P is received from the automation framework 230 from previous execution of the respective IT process and is stored in the data lake 208 (e.g., in the canonical representation provided by the API connector 240). Once trained, the model M collectively describes multiple executions of the IT process by attribute values and can be used to distinguish typical observations from atypical observations (i.e., anomalies) from incoming data (new data).

The following notation is used here for labelling purposes and mathematical expressions:

$\mathbb{R}$ Set of records of execution of an IT process collected over time. This (or a subset) is the historical data foundation for machine learning (i.e., training of the model M).

r A single IT process execution record (e.g., $\mathbb{R} = \{r_1, \ldots, r_n\}$, where n is a number of executions of the respective IT process).

A Attribute of execution of a respective IT process.

A* Attribute within the model M, where $\{A^*\} \subseteq \{A\}$ (also referred to herein as relevant attribute).

a Value of an attribute.

In some implementations, historical data representative of past executions of an IT process is selected from the data lake 208. At least a portion of the selected data (the set of records $\mathbb{R}$) is used for training of a respective model M. In some examples, and as introduced above, the data lake 208 provides all records r in a structured format (e.g., as depicted by way of example in Tables 2 and 3, above). In this manner, attributes A and their respective values a can be extracted with relative ease.

In some implementations, the attributes can be optionally segmented. In some examples, segmentation can be provided based on dimensions. Example dimensions can include, without limitation, data center, name of IT process, and the like. If segmentation is applied, all further processing to train the model M are performed per segment. In this manner, the resulting model M is specific to an IT process and a segment (e.g., the IT process within a specific data center).

In further detail, and by way of non-limiting example, an IT process $P_1$ can be executed in multiple data centers (e.g., $DC_1$, $DC_2$). An example set of records $\mathbb{R}_{P_1}$ can include records for each of the multiple data centers. For example:

$$\mathbb{R}_{P_1} = \{r_{1,DC1}, r_{2,DC2}, r_{3,DC1}\}$$

The example set of records $\mathbb{R}_{P_1}$ can be segment based on data center to provide:

$$\mathbb{R}_{P_1,DC1} = \{r_{1,DC1}, r_{3,DC1}\} \text{ and } \mathbb{R}_{P_1,DC2} = \{r_{2,DC2}\}$$

Respective models (e.g., $M_{P1,DC1}$, $M_{P1,DC2}$) can be trained based on the segmented sets of records, where both models are specific to the IT process, and each model is specific to a respective data center.

In some examples, a number of records can be optionally weighted. For example, a number of records can be weighted by age. In some examples, weighting of a number of records can include multiplying a number of instances of a record r within the data set for learning (training data) based on age. For example, each record r is associated with a time. In some examples, the time represents a time, at which the IT process is executed (e.g., starts execution, ends execution). In some examples, a time difference can be determined for each record r based on the time. For example, a time difference can be calculated as the difference between a current time (e.g., a time at which the record r is retrieved from the data lake 208 to train the model) and the time associated with the record r. The time difference can be compared to a threshold time difference and, if the time difference exceeds the threshold time difference (e.g., the record is older than the threshold time difference), a number of instances of the record r is multiplied by a first value (e.g., 1), and if the time difference does not exceed the threshold time difference (e.g., the record is newer than the threshold time difference), the number of instances of the record r is multiplied by a second value (e.g., 2).

For example, and without limitation, for an IT process $P_1$, a set of records can be retrieved (from the data lake 208) as $\mathbb{R}_{P1}=\{r_1, r_2, r_3\}$, where each record r is associated with a respective time t (e.g., $\{t_1, t_2, t_3\}$). Although three records r are used in this non-limiting example, it is contemplated that the set of records $\mathbb{R}$ can include any appropriate number of records r (e.g., hundreds, thousands). Continuing with this example, respective time differences (e.g., $\{\Delta t_1, \Delta t_2, \Delta t_3\}$) can be calculated and each can be compared to a threshold time difference ($\Delta t_{THR}$). In this example, it can be determined that $\Delta t_1$ and $\Delta t_2$ exceed $\Delta t_{THR}$, and that $\Delta t_3$ does not exceed $\Delta t_{THR}$. Consequently, the set of records $\mathbb{R}_{P1}$ can be modified to include multiple instances of $r_3$ (e.g., $\mathbb{R}_{P1}=\{r_1, r_2, r_3, r_3\}$).

In some implementations, the set of records $\mathbb{R}$ is processed using descriptive analysis. In some examples, during descriptive analysis, stochastic properties of each of the attributes A are calculated, which describe the distribution of values a per attribute. Tables 5 and 6, below, respectively depict non-limiting examples of nominal and cardinal attributes.

TABLE 5

Example Data - Statistic Description of Nominal attribute "System Business Type"

| System Business Type | Total Count | Amount |
|---|---|---|
| Production | 3250 | 0.65 |
| Test | 700 | 0.14 |
| Demo | 250 | 0.05 |
| Development | 500 | 0.1 |
| Validation | 250 | 0.05 |
| Sandbox | 50 | 0.01 |

TABLE 6

Example Data - Statistic Description of Example Cardinal Attributes

| Measure | Mean (sec) | Variance | Kurtosis |
|---|---|---|---|
| Process Gross Runtime (seconds) | 3400 | 0.24 | 0 |
| Process Wait time (seconds) | 255 | 0.33 | 0 |
| Task Runtime (seconds) | 33 | 1.42 | 0.5 |

In some examples, a gaussian distribution (depicted in FIG. 2) is assumed for attributes with metric values (or ordinal values), as depicted, for example, in Tables 5 and 6. Attributes having value distributions with a relatively low kurtosis are not considered. In this manner, attributes that may be less representative of the respective IT process can be filtered from use in providing the model. Such attributes, although provided in records of executions of IT processes, would be deemed as irrelevant attributes. Kurtosis can be described as the shape of a probability distribution and can be estimated from a sample from a population. The parameters mean ($\mu$) and standard deviation ($\sigma$) are determined and stored per attribute (metric/ordinal attribute). In some examples, a kurtosis value can be calculated based on the mean ($\mu$) and the standard deviation ($\sigma$).

In some examples, for nominal attributes, a histogram is generated describing the probability of all values per attribute. In some examples, the histogram is generated based on a set of bins (buckets) defined across a value range (e.g., minimum value of the attribute across all records, maximum value of the attribute across all records). In some examples, each bin has a width that can account for a sub-range of values within the value range. For example, for each record r, a value of an attribute is determined and is assigned to a bin within the histogram. Using bins having a width greater than a minimum value (e.g., 1) and less than a maximum value (e.g., 10), enables smoothing over irregularities in attribute values without over-smoothing the data set.

Like analysis for non-nominal attributes, attributes with low degree of information are discarded from statistical model. In this manner, attribute values that may be less representative of the respective IT process can be filtered from use in providing the model. Such attributes, although provided in records of executions of IT processes, would be deemed as irrelevant attributes. The degree of information is determined by calculating an entropy of the attribute value. Entropy can be described as a measure of uncertainty in a variable, in the context of the present disclosure, an attribute value. Histograms and entropy calculation are discussed in further detail in Entropy-based Histograms for Selectivity Estimation, by Hien To et al., which is incorporated herein by reference in the entirety.

For example, an attribute histogram for values across all records in the set of records can be provided (e.g., by a histogram generation module (not shown) that receives values of an attribute across all records, and outputs a histogram), and an entropy value for the attribute can be determined (e.g., by an entropy value calculation module (not shown) that receives the histogram, calculates the entropy value, and outputs the entropy value). The entropy value is compared to a threshold entropy value. If the entropy value exceeds the threshold entropy value, the attribute is not accounted for in the model (e.g., is discarded from the model). If the entropy value does not exceed the threshold entropy value, the attribute is accounted for in the model.

Accordingly, the model of the IT process is provided as a statistical model that includes a statistical distribution with respective parameters ($\mu$, $\sigma$) for each attribute having a metric (ordinal) value, and a probability distribution for each attribute having a nominal value. That is, the statistical model includes a set of statistical distributions, each statistical distribution having respective parameters ($\mu$, $\sigma$) and being specific to an attribute having a metric (ordinal) value, and the statistical model includes a set of probability distributions, each probability distribution being specific to an attribute having a nominal value.

Figure 3:
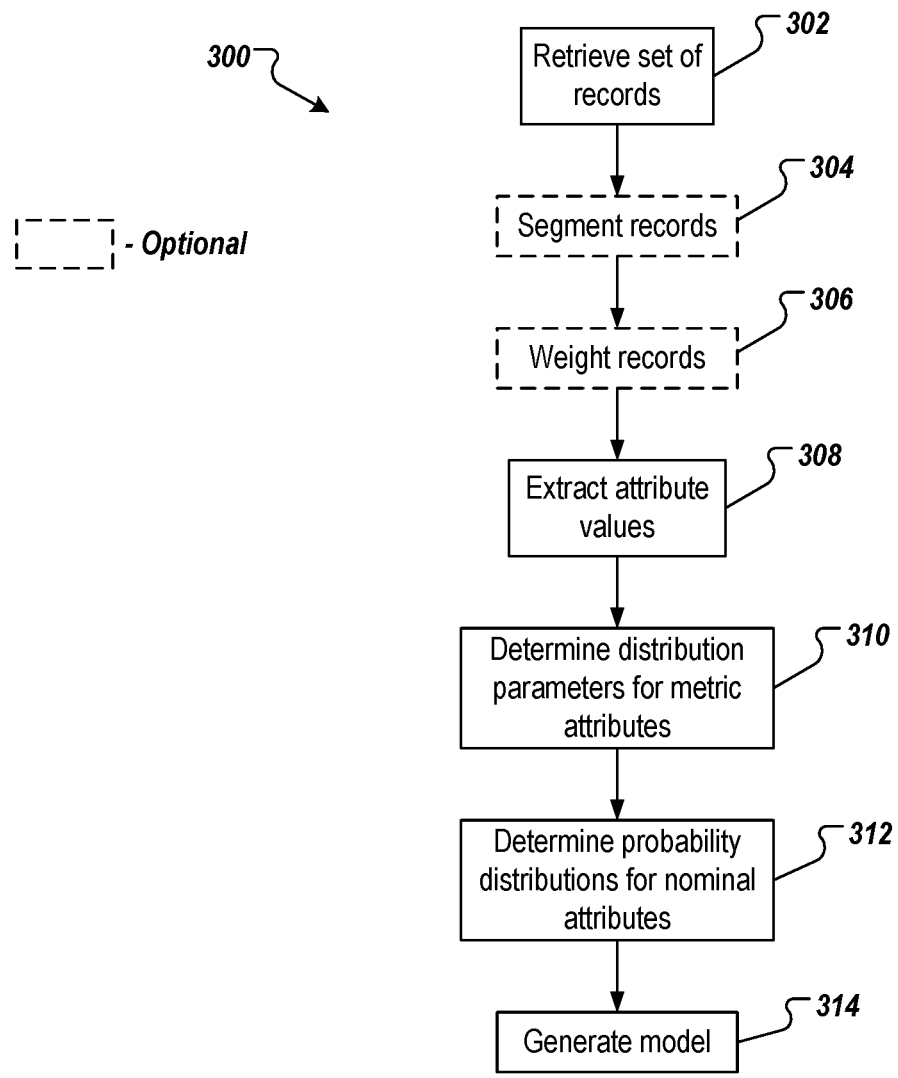
FIGS. 3 and 4 depict example processes that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. The example process 300 can be executed to provide a model of executions of an IT process in accordance with implementations of the present disclosure.

A set of records is retrieved (302). For example, a set of records $\mathbb{R}$ is retrieved for an IT process P. In some examples, the set of records include records representative of automated executions of the IT process within one or more managed systems. For example, the monitoring system 232 of FIG. 2, queries the data lake 208 based on an identifier that uniquely identifies the IT process, and the data lake 208 returns the set of records in response to the query. In some examples, the identifier is provided as a series of characters that uniquely identifies the IT process among a set of IT processes. In some examples, the identifier is a name of the IT process.

The set of records is segmented (304). In some examples, only a portion of the set of records is to be used in providing a model for the IT process. For example, and as described in detail herein, the set of records can be segmented based on a dimension (e.g., data center). In this manner, the segment of records (i.e., sub-set of records of the set of records) is used to provide the model, which is specific to the IT process and the dimension. A number of records in the set of records is weighted (308). For example, and as described in detail herein, a number of instances of a record can be multiplied based on an age of the record.

Attribute values are extracted (308). For example, and as described herein, an attribute value for each attribute of each record in the set of records (or segment of records) is read from the records. For any metric attributes, distribution parameters are determined (310). For example, and as described herein, for each metric attribute a distribution is provided based on all attribute values for the metric attribute, and a mean ($\mu$) and a standard deviation ($\sigma$) are determined for the metric attribute. For any nominal attributes, probability distributions are determined (312). For example, and as described herein, a histogram is generated for each nominal attribute and represents a probability distribution for attribute values of the nominal attribute across all records in the set of records (or segment of records).

A model is generated (314). For example, the model is provided as a computer-readable file that stores the distribution parameters determined for metric attributes in the set of records (or segment of records) and the probability distributions for nominal attributes in the set of records (or segment of records). In some examples, attributes that are determined to be irrelevant are absent from the model. For example, and as described herein, attributes can be considered irrelevant based on kurtosis or entropy, and distribution parameters or probability distributions for such attributes are not included in the model. Accordingly, the model accounts for so-call relevant attributes (A*). In some examples, the model is stored in computer-readable memory and is associated with the identifier that uniquely identifies the IT process that the model is representative of. In this manner, the model can be retrieved from memory based on the identifier.

In accordance with implementations of the present disclosure, after a model M has been created, the model M is used for anomaly detection in records received from the one or more managed systems 206. In some implementations, and as described in further detail herein, an execution record $r_{new}$ is received and is representative of automated execution of an IT process within a managed system 206. Attribute values are processed in view of the model M to calculate an anomaly score $S(r_{new})$. As described herein, the anomaly score indicates whether the execution record $r_{new}$ represents a typical execution of the IT process or an anomalous (outlier) execution of the IT process.

In some examples, not all attributes A of the execution record $r_{new}$ are relevant for evaluating the IT process. For example, the model M can be referenced to determine the attributes that the model M accounts for (e.g., the attributes not discarded based on kurtosis or entropy, as described above), and relevant attributes A* are determined. For example, a set of relevant attributes can be provided as $\mathbb{A}^* = \{A_1^*, \ldots, A_d^*\}$, where d is the number of relevant attributes. In short, the set of relevant attributes includes all attributes accounted for in the model M (i.e., having a statistical distribution or a probability distribution in the model M). In some examples, all of the attributes of the record $r_{new}$ can be considered relevant and be included in the set of relevant attributes. In some examples, a sub-set of the attributes of the record $r_{new}$ can be considered relevant and be included in the set of relevant attributes. Attribute values for the relevant attributes are read from record to be analyzed. For each relevant attribute A*, the attribute value a is compared to its statistical distribution or probability distribution provided in the statistical model.

In further detail, for each nominal attribute, the probability p(a) of the attribute value a is looked up in the probability distribution of the respective attribute A* in the model M. The probability p(a) is compared to intervals of standard normal distribution and a score is assigned. Example intervals can include: $\mu\pm\sigma$, $\mu\pm2\sigma$, and $\mu\pm3\sigma$. For example:

TABLE 7

Example Probability Values

| Interval | Probability (p($\alpha$) w/in interval) | Probability (p($\alpha$) outside interval) |
| --- | --- | --- |
| $\mu \pm \sigma$ | 68.3% | 31.7% |
| $\mu \pm 2\sigma$ | 95.5% | 4.5% |
| $\mu \pm 3\sigma$ | 99.7% | 0.3% |

In some implementations, the score is determined as:

$$\text{Score}(A_i) = \begin{cases} 2: p(a) \le (1-2\sigma) \\ 1: (1-2\sigma) > p(a) \le (1-\sigma) \\ 0: p(a) \ge (1-\sigma) \end{cases}$$

where $A_i$ is the $i^{th}$ nominal attribute being considered in a sub-set of relevant attributes (e.g., $\mathbb{A}^* = \{A_i^*, \ldots, A_j^*\}$, where j is the number of nominal attributes in the set of relevant attributes). Accordingly, and in the above example, the score can be equal to 1, 2, or 3 for a nominal attribute.

For each metric attribute, the probability p(a) of the attribute value a is calculated based on the distribution parameters $\mu$, $\sigma$ provided in the model M for the respective relevant attribute A*. In some implementations, the score is determined as:

$$\text{Score}(A_i) = \begin{cases} 2: p(a) \le (1-2\sigma) \\ 1: (1-2\sigma) > p(a) \le (1-\sigma) \\ 0: p(a) \ge (1-\sigma) \end{cases}$$

where $A_i$ is the $i^{th}$ metric attribute being considered in a sub-set of relevant attributes (e.g., $\mathbb{A}^* = \{A_1^*, \ldots, A_k^*\}$, where k is the number of metric attributes in the set of relevant attributes). Accordingly, and in the above example, the score can be equal to 1, 2, or 3 for a metric attribute. In the above examples, the probabilities p(a) for the attribute value a is calculated (using respective statistical information provided in the model M depending on value type (nominal, metric)) and the same scoring relationship is used for all attributes.

After a score has been determined for all of the relevant attributes (Score($A_i$)), an overall score S is calculated for the record $r_{new}$. In some examples, the overall score is calculated as:

$$S(r_{new}) = \sum_{i=1}^{d} Score(A_i)$$

That is, the overall score is provided as the sum of scores for all attributes in the set of relevant attributes. In some examples, a normalized score S* is determined for the record $r_{new}$. In some examples, the normalized score is calculated as:

$$S^*(r_{new}) = \frac{S(r_{new})}{|\{A^*\}| \times 2}$$

where $|\{A^*\}|$ is the number (count) of attributes being used for the statistical data model. The normalized score enables meaningful comparison of anomaly scores between records and ranges within an interval (e.g., [0, 1]).

The normalized anomaly score S* is a measure to describe the degree of deviation between a typical population of records R and a specific record r. A higher score indicates more deviation from a normal population. A lower score indicates a more typical record. In some examples, the anomaly is provided as input to the notification manager 242 of FIG. 2, which selectively issues notifications. As one example, for each record with an anomaly score that meets a threshold anomaly score ($S_T$) (e.g., $S^* \geq S_T$), a notification is created and issued. In some examples, the threshold anomaly score can be static. In some examples, the threshold anomaly score can be adjusted over time. For example, the threshold anomaly score is periodically adjusted to identify a top n outliers per period (e.g. per week or month). For example, a first value for the threshold anomaly score can be used and a set of outlier records can be identified. If the set of outlier records includes a number of records that is less than n, the threshold anomaly score is adjusted to a second value, lower than the first value, and the set of outlier records can be redetermined based on the adjusted threshold anomaly score. In some examples, the notification manager 242 does not raise alerts at all, and instead return all scored records sorted by their score value. This approach is helpful when all records are to be reviewed, and the respective scores enable prioritization.

Figure 4:
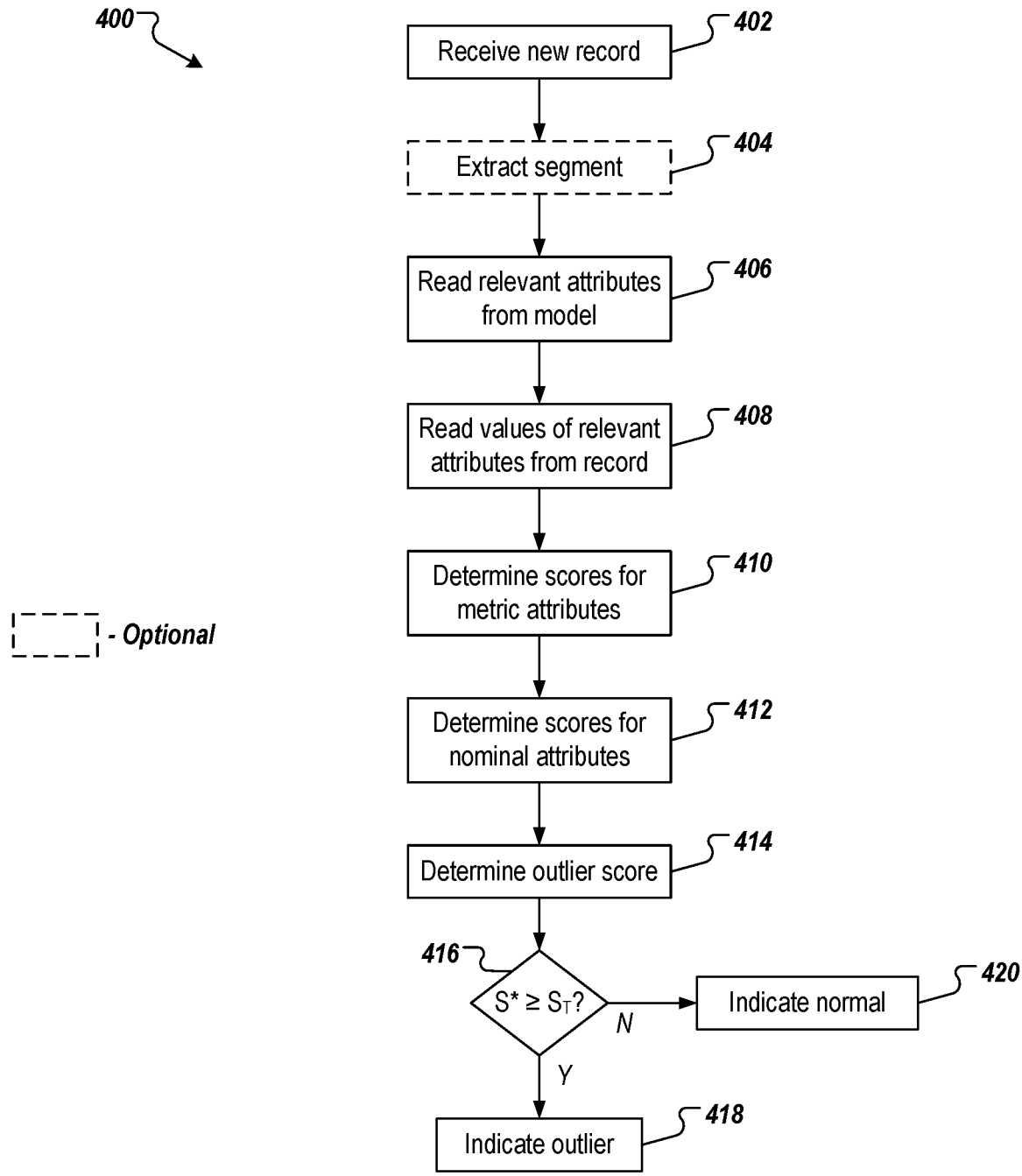

FIG. 4 depicts an example process 400 that can be executed in accordance with implementations of the present disclosure. In some examples, the example process 400 is provided using one or more computer-executable programs executed by one or more computing devices. The example process 400 can be executed for anomaly detection in accordance with implementations of the present disclosure.

A new record is received (402). For example, the monitoring system 232 of FIG. 2 receives a record from the automation framework 230, the record including attributes and attribute values representing execution of an IT process automatically executed within a managed system 206. A segment is extracted (404).

Relevant attributes are read from a model (406). For example, and as described herein, a model representative of historical executions of the IT process can be retrieved from memory (e.g., based on the identifier assigned to the IT process). The attributes accounted for in the model are identified as relevant attributes (e.g., the model includes a list of attributes, for which the model includes distribution parameters or probability distributions), each attribute in the list of attributes being a relevant attribute. Values of relevant attributes are read from the new record (408). For example, for each relevant attribute determined from the model, the corresponding attribute value within the record is read.

A score for each metric attribute is determined (410) and a score for each nominal attribute is determined (412). For example, and as described herein, a score for each attribute is determined as 0, 1, or 2 based on the distribution parameters or the probability distribution for the respective attribute within the model. An outlier score for the new record is determined (414). For example, and as described herein, the outlier score is calculated as a sum of scores for all attributes. In some examples, the outlier score is provided as a normalized score (S*), described herein. It is determined whether the outlier score meets a threshold outlier score (416). If the outlier score meets the threshold outlier score, the record is indicated as outlier (418). If the outlier score does not meet the threshold outlier score, the record is indicated as normal (420).

Implementations of the present disclosure provide the following example advantages. Implementations of the present disclosure improve both efficiency and effectiveness of finding anomalies in execution of IT processes. For example, values from a higher number of attributes are combined for detecting anomalies. As more information is available, the relevant information is not excluded from the detection process. Further, implementations of the present disclosure combine values from several attributes jointly, in combination. Several weak indicators for a problem are overseen by single-attribute thresholds, which leads to higher effectiveness (e.g., fewer false positives).

In some examples, operating a system landscape, especially in a cloud-computing environment, can be relatively volatile, where trends and changes occur constantly. The process of generating the statistical model (the actual training) of the present disclosure can be done automatically. Both, the computational effort and time effort for training the model is relatively low. This enables the model of the present disclosure to be regularly re-trained and kept up to date. When regular re-trainings are combined with data aging, or only recent data is used for training only, the statistical model considers trends in execution. The capability of re-training the model quickly improves efficiency of anomaly detection. Further, the improved quality of anomaly detection provided through implementations of the present disclosure enable minimization of the overall risk of running and operating processes within software systems and TCO is lowered as issues can be detected even before they have real impact.

Figure 5:
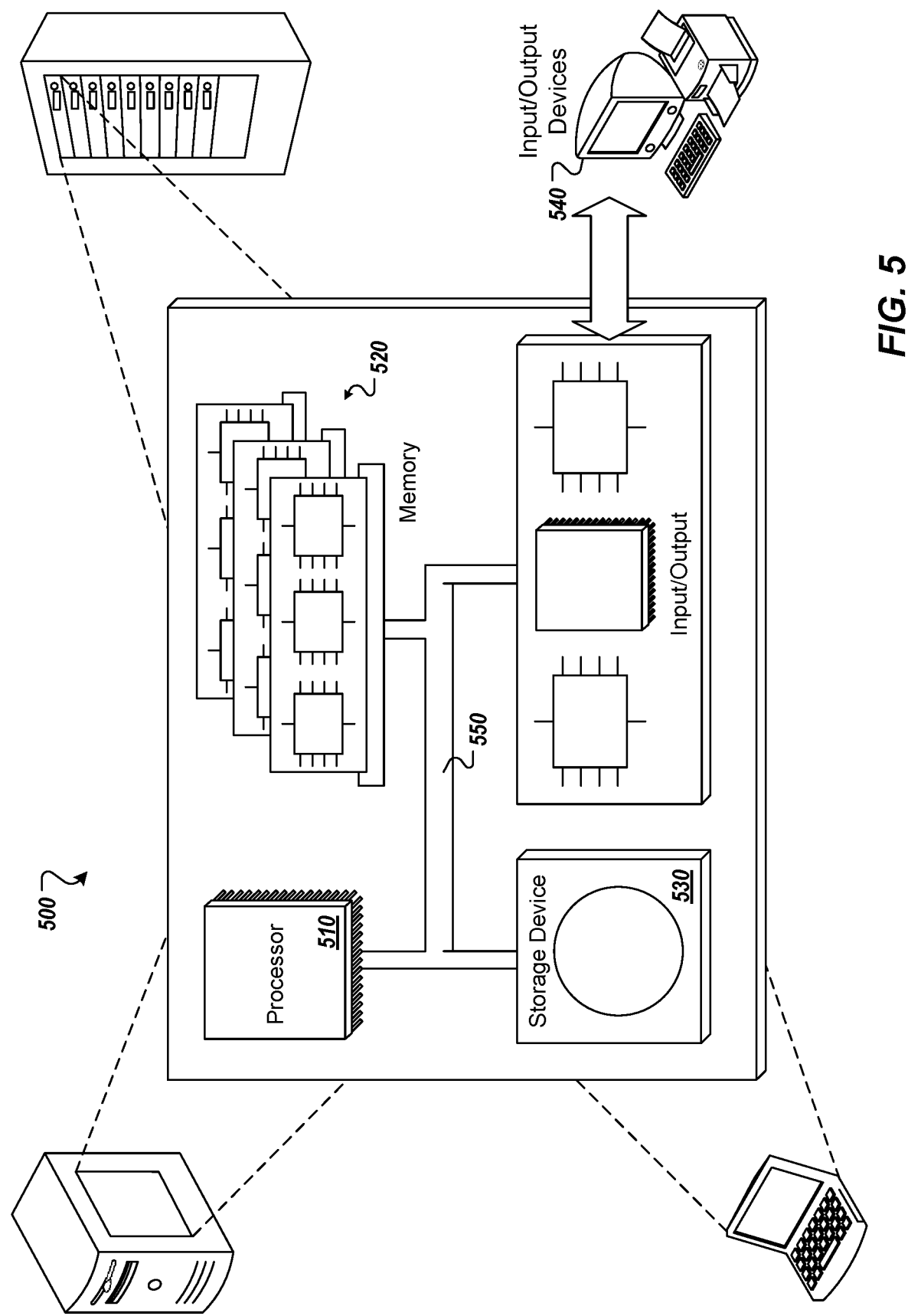
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for anomaly detection for automated information technology (IT) processes, the method being executed by one or more processors and comprising:

receiving, by a monitoring system, a record comprising a set of attributes, each attribute having an attribute value, the record representing automatic execution of an IT process within a first managed system of a set of managed systems;

retrieving a first model from a set of models, the first model being specific to the IT process and the first managed system by representing multiple historical executions of the IT process within the first managed system based on segmented historical data and weighting at least one historical record by providing redundant instances of the at least one historical record in the segmented historical data, the first model comprising a set of distribution parameters associated with a first type of attribute and a set of probability distributions associated with a second type of attribute, the set of models comprising a second model that is specific to the IT process and a second managed system within which the IT process executes;

determining, for a first attribute of the set of attributes, a first score based on distribution parameters provided from the set of distribution parameters and a value of the first attribute, the first attribute being of the first type of attribute;

determining, for a second attribute of the set of attributes, a second score based on a probability distribution provided from the set of probability distributions and a value of the second attribute, the second attribute being of the second type of attribute;

calculating an outlier score representative of the automatic execution of the IT process at least partially based on the first score and the second score; and selectively indicating that the automatic execution of the IT process is anomalous based on the outlier score.

2. The method of claim 1, wherein the outlier score is a normalized score that is calculated based on a sum of the first score and the second score.

3. The method of claim 1, wherein the distribution parameters comprise a mean ($\mu$) and a standard deviation ($\sigma$).

4. The method of claim 1, wherein a set of relevant attributes is determined from the model, and the first attribute and the second attribute of the set of attributes are identified as relevant attributes based on the set of relevant attributes.

5. The method of claim 1, further comprising:
retrieving historical data representative of historical executions of the IT process in the first managed system and the second managed system, the historical data comprising historical records, each historical record comprising a set of historical attributes, each historical attribute having a historical value associated therewith;
segmenting the historical data to provide the segmented historical data;
for each historical attribute in the segmented historical data of the first type of attribute, providing distribution parameters to be included in the set of distribution parameters;
for each historical attribute in the segmented historical data of the second type of attribute, providing a probability distribution to be included in the set of probability distributions; and
generating the first model comprising the set of distribution parameters and the set of probability distributions.

6. The method of claim 1, further comprising, in response to indicating that the execution of the IT process is anomalous, automatically transmitting a notification to a front-end client.

7. The method of claim 1, wherein the first type of attribute comprises a metric attribute and the second type of attribute comprises a nominal attribute.

8. A non-transitory computer-readable storage medium coupled to one or more processors and having instructions stored thereon which, when executed by the one or more processors, cause the one or more processors to perform operations for anomaly detection for automated information technology (IT) processes, the operations comprising:
receiving, by a monitoring system, a record comprising a set of attributes, each attribute having an attribute value, the record representing automatic execution of an IT process within a first managed system of a set of managed systems;
retrieving a first model from a set of models, the first model being specific to the IT process and the first managed system by representing multiple historical executions of the IT process within the first managed system based on segmented historical data and weighting at least one historical record by providing redundant instances of the at least one historical record in the segmented historical data, the first model comprising a set of distribution parameters associated with a first type of attribute and a set of probability distributions associated with a second type of attribute, the set of models comprising a second model that is specific to the IT process and a second managed system within which the IT process executes;
determining, for a first attribute of the set of attributes, a first score based on distribution parameters provided from the set of distribution parameters and a value of the first attribute, the first attribute being of the first type of attribute;
determining, for a second attribute of the set of attributes, a second score based on a probability distribution provided from the set of probability distributions and a value of the second attribute, the second attribute being of the second type of attribute;
calculating an outlier score representative of the automatic execution of the IT process at least partially based on the first score and the second score; and
selectively indicating that the automatic execution of the IT process is anomalous based on the outlier score.

9. The computer-readable storage medium of claim 8, wherein the outlier score is a normalized score that is calculated based on a sum of the first score and the second score.

10. The computer-readable storage medium of claim 8, wherein the distribution parameters comprise a mean ($\mu$) and a standard deviation ($\sigma$).

11. The computer-readable storage medium of claim 8, wherein a set of relevant attributes is determined from the model, and the first attribute and the second attribute of the set of attributes are identified as relevant attributes based on the set of relevant attributes.

12. The computer-readable storage medium of claim 8, wherein operations further comprise:
retrieving historical data representative of historical executions of the IT process in the first managed system and the second managed system, the historical data comprising historical records, each historical record comprising a set of historical attributes, each historical attribute having a historical value associated therewith;
segmenting the historical data to provide the segmented historical data;
for each historical attribute in the segmented historical data of the first type of attribute, providing distribution parameters to be included in the set of distribution parameters;
for each historical attribute in the segmented historical data of the second type of attribute, providing a probability distribution to be included in the set of probability distributions; and
generating the first model comprising the set of distribution parameters and the set of probability distributions.

13. The computer-readable storage medium of claim 8, wherein operations further comprise, in response to indicating that the execution of the IT process is anomalous, automatically transmitting a notification to a front-end client.

14. The computer-readable storage medium of claim 8, wherein the first type of attribute comprises a metric attribute and the second type of attribute comprises a nominal attribute.

15. A system, comprising:
a computing device; and
a computer-readable storage device coupled to the computing device and having instructions stored thereon which, when executed by the computing device, cause the computing device to perform operations for anomaly detection for automated information technology (IT) processes, the operations comprising:

receiving, by a monitoring system, a record comprising a set of attributes, each attribute having an attribute value, the record representing automatic execution of an IT process within a first managed system of a set of managed systems;

retrieving a first model from a set of models, the first model being specific to the IT process and the first managed system by representing multiple historical executions of the IT process within the first managed system based on segmented historical data and weighting at least one historical record by providing redundant instances of the at least one historical record in the segmented historical data, the first model comprising a set of distribution parameters associated with a first type of attribute and a set of probability distributions associated with a second type of attribute, the set of models comprising a second model that is specific to the IT process and a second managed system within which the IT process executes;

determining, for a first attribute of the set of attributes, a first score based on distribution parameters provided from the set of distribution parameters and a value of the first attribute, the first attribute being of the first type of attribute;

determining, for a second attribute of the set of attributes, a second score based on a probability distribution provided from the set of probability distributions and a value of the second attribute, the second attribute being of the second type of attribute;

calculating an outlier score representative of the automatic execution of the IT process at least partially based on the first score and the second score; and selectively indicating that the automatic execution of the IT process is anomalous based on the outlier score.

16. The system of claim 15, wherein the outlier score is a normalized score that is calculated based on a sum of the first score and the second score.

17. The system of claim 15, wherein the distribution parameters comprise a mean ($\mu$) and a standard deviation ($\sigma$).

18. The system of claim 15, wherein a set of relevant attributes is determined from the model, and the first attribute and the second attribute of the set of attributes are identified as relevant attributes based on the set of relevant attributes.

19. The system of claim 15, wherein operations further comprise:

retrieving historical data representative of historical executions of the IT process in the first managed system and the second managed system, the historical data comprising historical records, each historical record comprising a set of historical attributes, each historical attribute having a historical value associated therewith;

segmenting the historical data to provide the segmented historical data;

for each historical attribute in the segmented historical data of the first type of attribute, providing distribution parameters to be included in the set of distribution parameters;

for each historical attribute in the segmented historical data of the second type of attribute, providing a probability distribution to be included in the set of probability distributions; and generating the first model comprising the set of distribution parameters and the set of probability distributions.

20. The system of claim 15, wherein operations further comprise, in response to indicating that the execution of the IT process is anomalous, automatically transmitting a notification to a front-end client.

* * * * *